United States Patent
Jung

(10) Patent No.: US 8,809,796 B2
(45) Date of Patent: Aug. 19, 2014

(54) LAG COMPENSATING X-RAY DETECTOR AND METHOD OF DRIVING THE SAME

(75) Inventor: Kwan-Wook Jung, Yongin (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 217 days.

(21) Appl. No.: 13/200,319

(22) Filed: Sep. 23, 2011

(65) Prior Publication Data

US 2012/0138808 A1 Jun. 7, 2012

(30) Foreign Application Priority Data

Dec. 3, 2010 (KR) .................. 10-2010-0122673

(51) Int. Cl.
 H01L 27/146 (2006.01)
 G01T 1/115 (2006.01)
 H04N 5/361 (2011.01)
 G01T 1/17 (2006.01)

(52) U.S. Cl.
 CPC ............... H04N 5/361 (2013.01); G01T 1/171 (2013.01)
 USPC ............ 250/370.09; 250/370.08; 378/62

(58) Field of Classification Search
 CPC .......... G01T 1/171; G01T 1/17; G01T 1/247; G01T 1/24; G01T 1/00; G01T 1/2928; G01T 7/005; H01L 27/14659; G06T 2207/10116
 USPC ............... 250/370.08–370.09; 257/E27.146; 378/62
 See application file for complete search history.

(56) References Cited

U.S. PATENT DOCUMENTS

| | | | | |
|---|---|---|---|---|
| 2004/0017891 | A1* | 1/2004 | Endo | 378/98.8 |
| 2004/0096036 | A1* | 5/2004 | Yanoff et al. | 378/98.8 |
| 2004/0119855 | A1* | 6/2004 | Partain et al. | 348/243 |
| 2004/0218729 | A1* | 11/2004 | Xue et al. | 378/210 |
| 2005/0123094 | A1 | 6/2005 | Suzuki | |
| 2007/0040099 | A1* | 2/2007 | Yokoyama et al. | 250/208.1 |
| 2009/0147921 | A1 | 6/2009 | Okamura | |
| 2009/0257556 | A1 | 10/2009 | Okamura | |

FOREIGN PATENT DOCUMENTS

| | | |
|---|---|---|
| JP | 2003-299640 | 10/2003 |
| KR | 10-2008-0043851 | 5/2008 |
| KR | 10-2008-0069672 | 7/2008 |
| KR | 10-2008-0102150 | 11/2008 |

OTHER PUBLICATIONS

Siewerdsen et al, A ghost story: Spatio-temporal response characteristics of an indirect-detection flat-panel imager, Aug. 1999, Medical Physics, vol. 26, Issue 8, pp. 1624-1641.*

* cited by examiner

Primary Examiner — David Porta
Assistant Examiner — Jeremy S Valentiner
(74) Attorney, Agent, or Firm — Robert E. Bushnell, Esq.

(57) ABSTRACT

An X-ray detector and a method of driving the X-ray detector, which accurately compensate for an image lag of an X-ray scanning by using an X-ray image and a dark image, are provided. A stand-by time for the X-ray scanning may be reduced by increasing the accuracy of the image lag compensation.

11 Claims, 9 Drawing Sheets

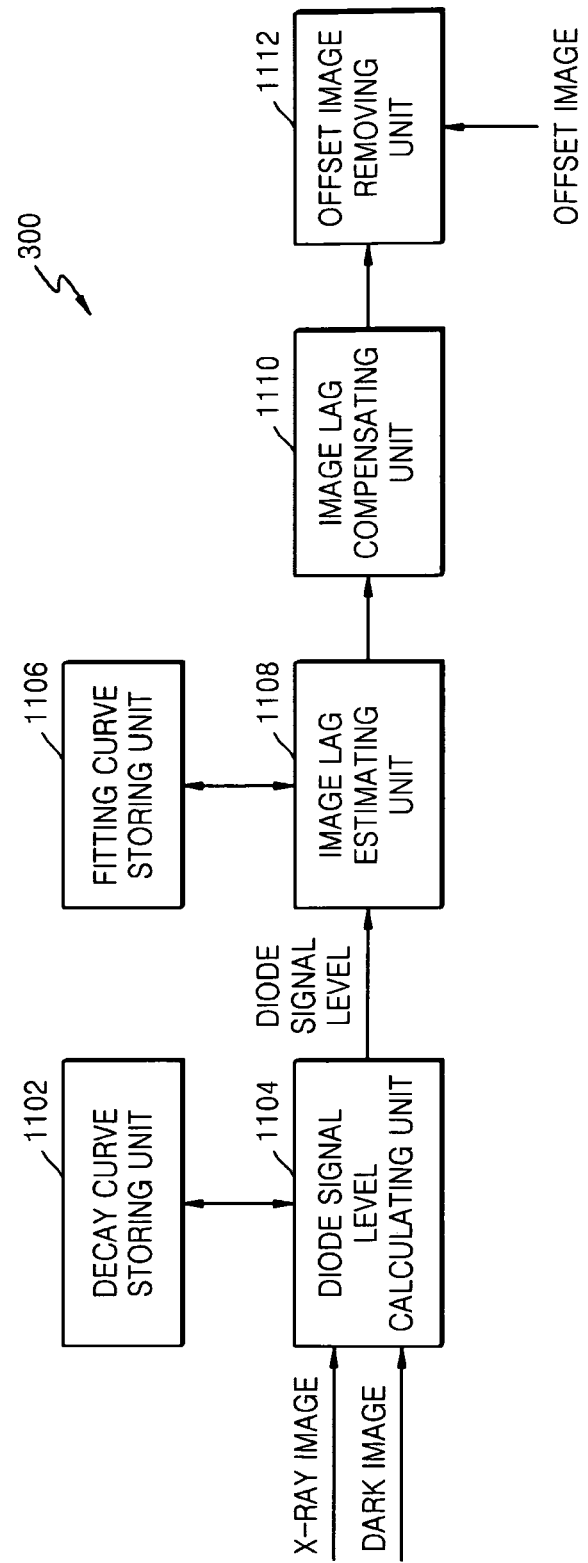

LAG COMPENSATING X-RAY DETECTOR AND METHOD OF DRIVING THE SAME

CLAIM OF PRIORITY

This application makes reference to, incorporates the same herein, and claims all benefits accruing under 35 U.S.C. §119 from an application earlier filed in the Korean Intellectual Property Office on 3 Dec. 2010 and there duly assigned Serial No. 10-2010-0122673.

BACKGROUND OF THE INVENTION

1. Field of the Invention

The present invention relates to an X-ray detector and a method of driving the X-ray detector.

2. Description of the Related Art

X-rays having a short wavelength can easily pass through a subject, and the amount of X-rays transmitted through the subject is determined by the internal density of the subject. In other words, the internal state of the subject may be indirectly observed by measuring the amount of X-rays transmitted through the subject.

An X-ray detector is a device that detects the amount of X-rays transmitted through a subject. The X-ray detector detects the amount of X-rays transmitted through the subject and displays the internal state of the subject on a display device. In general, X-ray detectors are used in medical diagnosis or nondestructive detection.

Currently, a flat panel digital radiography, that is, not requiring a photographic film, is popularly used as an X-ray detector.

SUMMARY OF THE INVENTION

The present invention provides an X-ray detector and a method of driving the X-ray detector by which an image lag of the X-ray detector is efficiently compensated for.

According to an aspect of the present invention, there is provided an X-ray detector including: a plurality of photo-sensing pixels, each of the photo-sensing pixels comprising a photodiode that generates an electrical detection signal corresponding to an incident light and a switching device that transmits the detection signal; a gate driver sequentially applying gate pulses, which turn on the switching device, to the switching device via a plurality of gate lines; and a read-out integrated circuit reading out the detection signal from the plurality of photo-sensing pixels, wherein the gate driver and the read-out integrated circuit read out a dark image used to estimate an image lag by an X-ray image after reading out the X-ray image obtained by an X-ray radiation.

The gate driver and the read-out integrated circuit may perform at least one gate scan and read out the dark image after reading out the X-ray image.

The X-ray detector may further include a signal processing unit correcting an image lag from the X-ray image and the dark image output from the read-out integrated circuit to form an X-ray scanning image, wherein the signal processing unit estimates a diode signal level of a photodiode by the X-ray radiation using the X-ray image and the dark image and estimates an image lag caused by the X-ray image using the estimated diode signal level.

The signal processing unit may include: a diode signal level calculating unit calculating the diode signal level from the X-ray image and the dark image using a decay curve illustrating decay tendency of the diode signal level according to the number of gate scans; an image lag estimating unit estimating the image lag by the X-ray radiation from the diode signal level using a fitting curve illustrating image lag reduction tendency according to the number of gate scans; and an image lag compensating unit compensating for the image lag by the X-ray radiation in a following X-ray scanning using the estimated image lag.

The signal processing unit may further include: a decay curve storing unit storing the decay curve; and a fitting curve storing unit storing the fitting curve.

The diode signal level calculating unit may calculate the signal level of the X-ray image as the diode signal level when the signal level is less than the signal saturation level and calculate the diode signal level by estimating the diode signal level by the X-ray radiation by corresponding the signal level of the dark image to the decay curve when the signal level is equal to the signal saturation level.

The gate driver and the read-out integrated circuit may further acquire an offset image by performing a read-out from the plurality of photo-sensing pixels without exposing the X-ray detector to an X-ray, and the signal processing unit may further include an offset image removing unit removing the offset image from the X-ray image.

The decay curve and the fitting curve may vary according to the photo-sensing pixel.

According to another aspect of the present invention, there is provided a method of driving an X-ray detector, the method including: exposing an X-ray detector to an X-ray; reading out an X-ray image formed by the X-ray radiation; reading out a dark image after reading out the X-ray image; and estimating an image lag using the X-ray image and the dark image.

The estimating the image lag may include: estimating a diode signal level of a photodiode by the X-ray radiation from the X-ray image and the dark image; and estimating an image lag of the X-ray image using the estimated diode signal level.

The method may further include: compensating for the image lag by the X-ray radiation in a following X-ray scanning using the estimated image lag, wherein the estimating the diode signal level is performed by calculating the diode signal level from the X-ray image and the dark image using a decay curve illustrating decay tendency of the diode signal level according to the number of gate scans, and the estimating the image lag is performed by estimating the image lag by the X-ray radiation from the diode signal level using the fitting curve illustrating image lag reduction tendency according to the number of gate scans.

The estimating the diode signal level may be performed by calculating the signal level of the X-ray image as the diode signal level when the signal level is less than the signal saturation level and calculating the diode signal level by estimating the diode signal level by the X-ray radiation by corresponding the signal level of the dark image to the decay curve when the signal level is equal to the signal saturation level.

The method may further include: acquiring an offset image by performing a read-out from the plurality of photo-sensing pixels without exposing the X-ray detector to the X-ray; and removing the offset image from the X-ray image.

The decay curve and the fitting curve may vary according to the photo-sensing pixel.

BRIEF DESCRIPTION OF THE DRAWINGS

A more complete appreciation of the invention, and many of the attendant advantages thereof, will be readily apparent as the same becomes better understood by reference to the following detailed description when considered in conjunc

FIG. 11 is a block diagram of a signal processing unit of FIG. 1, according to an embodiment of the present invention.

DETAILED DESCRIPTION OF THE INVENTION

Hereinafter, the present invention will now be described more fully with reference to the accompanying drawings, in which exemplary embodiments of the invention is shown. The following description and drawings are provided to give a sufficient understanding of the present invention, and functions or constructions that are well-known to one of ordinary skill in the art may be omitted. The invention may, however, be embodied in many different forms and should not be construed as being limited to the embodiments set forth herein; rather, these embodiments are provided so that the disclosure will be thorough and complete, and will fully convey the concept of the invention to those of ordinary skill in the art.

Figure 1:
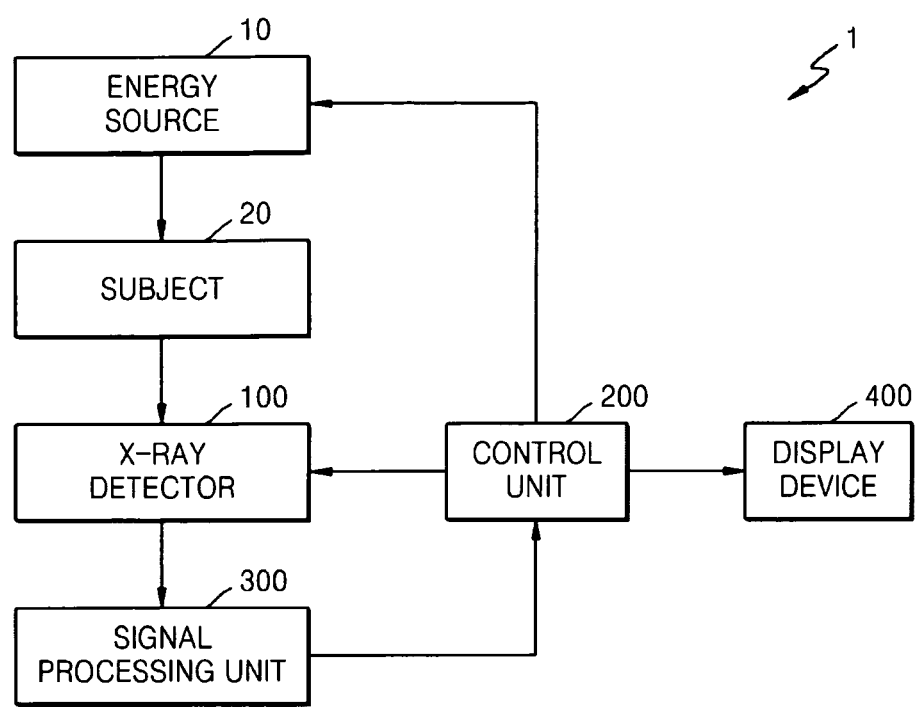
- FIG. 1 is a block diagram of an X-ray detection system according to an embodiment of the present invention.

FIG. 1 is a block diagram of an X-ray detecting system 1 according to an embodiment of the present invention.

Referring to FIG. 1, the X-ray detection system 1 includes an energy source 10, an X-ray detector 100, a control unit 200, a signal processing unit 300, and a display device 400.

The energy source 10 radiates radioactive rays such as X-rays to a subject 20.

The X-ray detector 100 includes a plurality of photo-sensing pixels in a flat panel to detect an X-ray. The X-ray detector 100 includes a plurality of photodiodes and switching devices to detect the amount of an X-ray transmitted through the subject 20. If an X-ray is applied to a photodiode when a reverse bias is applied to the photodiode, an electrical detection signal corresponding to the amount of the transmitted X-ray is generated in each photodiode. The detection signal is read out by data lines and input to a read-out integrated circuit.

The X-ray detector 100 performs an offset read-out to obtain an offset image when the X-ray is not radiated and an X-ray read-out to obtain an X-ray image when the X-ray is radiated. In addition, the X-ray detector 100 adjusts an offset by scrubbing before the offset read-out and initializes the signal by scrubbing before the X-ray read-out. While scrubbing, gate scan may be performed at least twice.

The control unit 200 controls operations of the energy source 10, the X-ray detector 100, and the display device 400 to form an X-ray image in which an offset is corrected. The control unit 200 controls a time and period of X-ray radiation of the energy source 10. The control unit 200 also controls a driving sequence for obtaining an offset image of the X-ray detector 100 and a driving sequence for obtaining an X-ray image of the X-ray detector 100.

The signal processing unit 300 converts the detection signal output from the X-ray detector 100 into a digital signal. The signal processing unit 300 generates an offset image and an X-ray image from the digital signal. The signal processing unit 300 generates an X-ray scanning image in which the offset is corrected by subtracting the offset image formed before the X-ray radiation from the X-ray image.

The display device 400 displays the X-ray scanning image in which the offset is corrected. The display device 400 may be a liquid crystal display (LCD), an organic light-emitting display device, a plasma display device, and the like.

Figure 2:
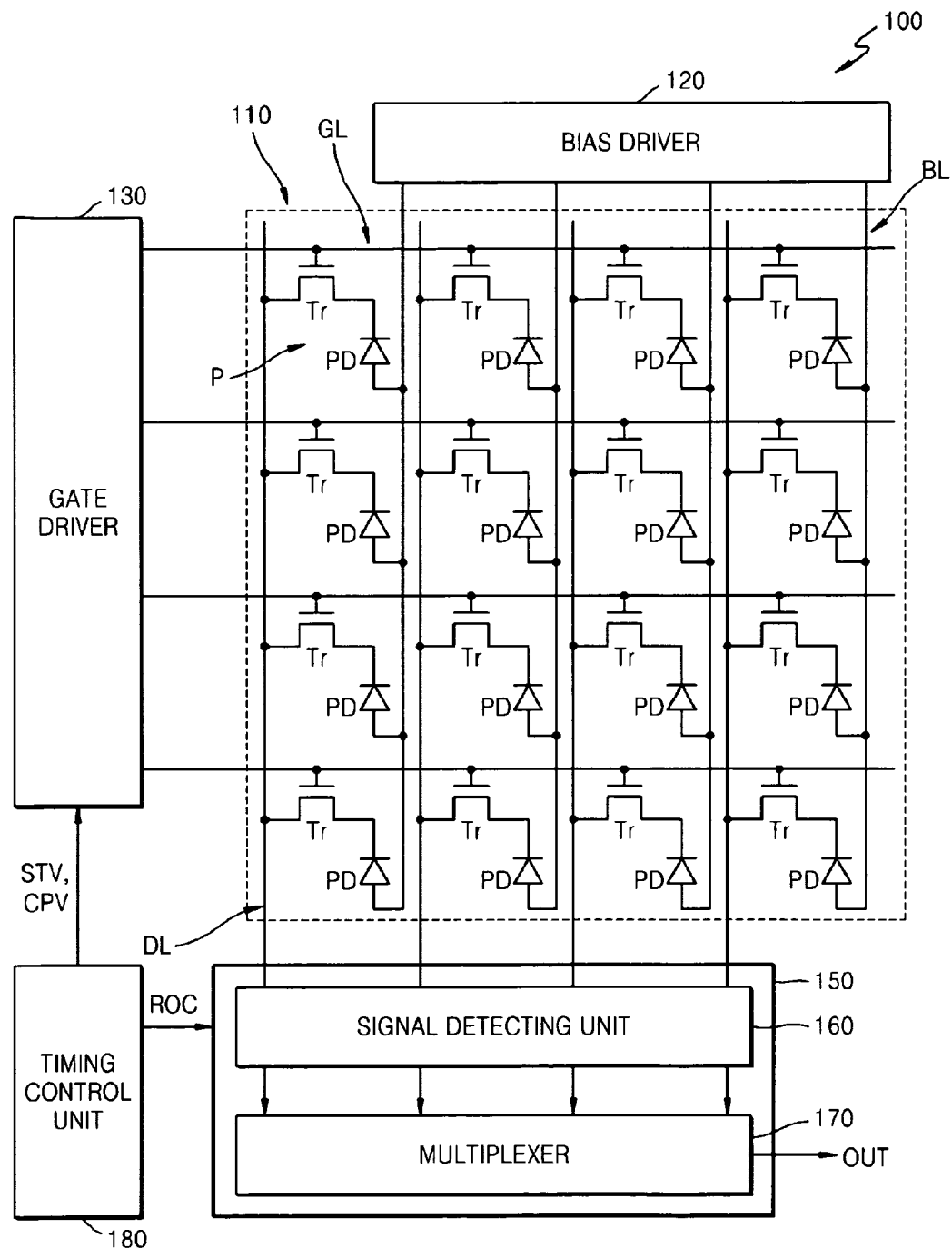
FIG. 2 schematically shows a structure of an X-ray detector of FIG. 1.
Figure 3:
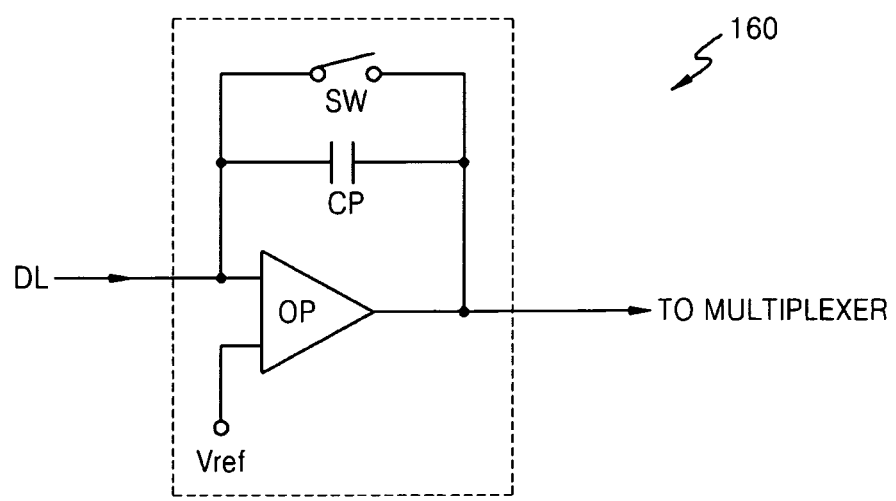
FIG. 3 is a circuit diagram of a signal detecting unit of FIG. 2.

FIG. 2 schematically shows a structure of an X-ray detector 100 of FIG. 1. FIG. 3 is a circuit diagram of a signal detecting unit 160 of FIG. 2.

The X-ray detector 100 includes a pixel unit 110, a bias driver 120, a gate driver 130, a read-out integrated circuit 150, and a timing control unit 180. The read-out integrated circuit 150 includes the signal detecting unit 160 and a multiplexer 170.

The pixel unit 110 senses an X-ray radiated from the energy source 10, photoelectrically converts the sensed X-ray into an electrical signal, and outputs the converted signal as an electrical detection signal. The pixel unit 110 includes a plurality of photo-sensing pixels P aligned in a matrix form near junctions between a plurality of gate lines GL and a plurality of data lines DL. The plurality of gate lines GL may cross the plurality of data lines DL at right angles. FIG. 2 shows 16 photo-sensing pixels P which are arranged in 4 rows and 4 columns, but the present invention is not limited thereto, and the number of photo-sensing pixels P may vary.

Each of the photo-sensing pixels P includes a photodiode PD that senses the X-ray and outputs the detection signal, e.g., a photo-detection voltage, and a switching device Tr that transmits the detection signal output from the photodiode PD in response to a gate pulse, wherein the switching device Tr may be a transistor. The current embodiment will be described with the transistor Tr as the switching device Tr.

The photodiode PD senses the X-ray radiated from the energy source 10 and outputs a signal generated from the sensed X-ray as the detection signal. The photodiode PD that is a device that photoelectrically converts an incident light into an electrical detection signal may be a PIN diode. A first electrode of the photodiode PD is electrically connected to a first electrode of the transistor Tr, and a second electrode of the photodiode PD is electrically connected to a bias line BL to which a bias voltage is applied.

The transistor Tr is a switching device that transmits the detection signal output from the photodiode PD. A gate electrode of the transistor Tr is electrically connected to a gate line GL, and a second electrode of the transistor Tr is electrically connected to the read-out integrated circuit 150 via a data line DL.

The bias driver 120 applies a driving voltage to a plurality of bias lines BL. The bias driver 120 may optionally apply a reverse bias or a forward bias to the photodiode PD.

The gate driver 130 sequentially applies gate pulses having a gate-on voltage level to the gate lines GL. The gate-on voltage level is a voltage level at which the transistors Tr of the photo-sensing pixels P are turned on. The transistors Tr of the photo-sensing pixels P are turned on in response to the gate pulses.

If the transistor Tr is turned on, the detection signal output from the photodiode PD is input to the read-out integrated circuit 150 via the transistor Tr and the data line DL. The gate driver 130 may be mounted on one side of the pixel unit 110 as an integrated circuit (IC) or may be formed on a substrate such as the pixel unit 110 by using a thin film process.

The read-out integrated circuit 150 reads out the detection signal output from the transistor Tr turned on in response to the gate pulses. The read-out integrated circuit 150 reads out the detection signal output from the photo-sensing pixel P in an offset read-out period in which the offset image is read out, an X-ray read-out period in which the detection signal is read out after X-ray radiation, and a dark read-out period in which a dark image is read out for compensating for an image lag.

The read-out integrated circuit 150 may include the signal detecting unit 160 and the multiplexer 170.

The signal detecting unit 160 includes a plurality of amplifying units corresponding to the plurality of data lines DL respectively, and each of the amplifying units includes an amplifier OP, a capacitor CP, and a reset device SW.

Referring to FIG. 3, the amplifier OP includes a first input terminal connected to the data line DL, a second input terminal to which a reference voltage Vref is applied, and an output terminal. The reference voltage Vref may be a ground voltage. The first input terminal may be an inverting input terminal of the amplifier OP, and the second input terminal may be a non-inverting input terminal of the amplifier OP. The signal output from the output terminal of the amplifier OP is input to the multiplexer 170.

One terminal of the capacitor CP is electrically connected to the first input terminal of the amplifier OP, and the other terminal of the capacitor CP is electrically connected to the output terminal of the amplifier OP.

The reset device SW discharges the voltage charged in the capacitor CP to reset the capacitor CP. The reset device SW is connected to the capacitor CP in parallel. One terminal of the reset device SW is electrically connected to one terminal of the capacitor CP, and the other terminal of the reset device SW is electrically connected to the other terminal of the capacitor CP. The reset device SW may include a switch that electrically connects both terminals of the capacitor CP. If the switch is closed, both terminals of the capacitor CP are electrically connected to each other, and the voltage charged in the capacitor CP is discharged. The switch of the reset device SW is closed during a gate scan mode to discharge the data line DL.

The multiplexer 170 receives a voltage signal from the amplifier OP of the signal detecting unit 160 and sequentially outputs the voltage signal to the signal processing unit 300. The multiplexer 170 may include switches corresponding to the amplifiers OP, respectively.

The timing control unit 180 generates a starting signal STV and a clock signal CPV and outputs them to the gate driver 130 to control the operation of the gate driver 130. In addition, the timing control unit 180 generates a read-out control signal ROC and outputs the read-out control signal ROC to the read-out integrated circuit 150 to control the operation of the read-out integrated circuit 150.

Figure 4:
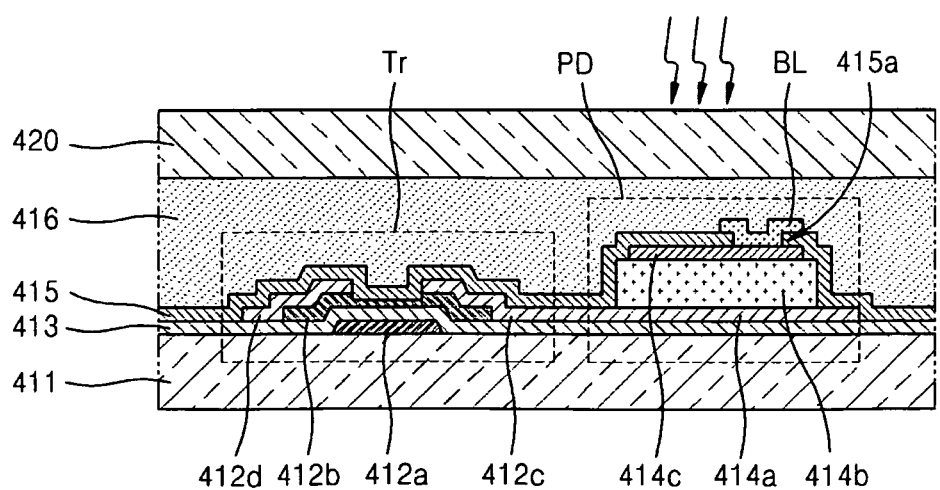
FIG. 4 is a cross-sectional view of a unit photo-sensing pixel of FIG. 2.

FIG. 4 is a cross-sectional view of a unit photo-sensing pixel P of FIG. 2.

Referring to FIG. 4, the unit photo-sensing pixel P includes a transistor Tr and a photodiode PD formed on a base substrate 411. The transistor Tr may include a gate electrode 412a, an active pattern 412b, a first electrode 412c, and a second electrode 412d. The photodiode PD may include a first electrode 414a, a photoconductive layer 414b, and a second electrode 414c.

The base substrate 411 may have a plate shape. The base substrate 411 may be formed of a transparent material, for example, glass, quartz, or a synthetic resin.

The gate electrode 412a of the transistor Tr is formed on the base substrate 411. The gate electrode 412a may protrude from the gate line GL and may be formed of a material used to form the gate line GL, for example, aluminum (Al) or an alloy of Al.

The gate electrode 412a is covered with a gate insulating layer 413. The gate insulating layer 413 may be formed of a silicon nitride (SiNx), a silicon oxide (SiOx), or the like.

The active pattern 412b of the transistor Tr is formed on the gate insulating layer 413. The active pattern 412b may include a channel layer formed on the gate insulating layer 413 and an ohmic contact layer formed on the channel layer. The channel layer may include amorphous silicon (a-Si), and the ohmic contact layer may include high-density doped amorphous silicon (n+ a-Si or p+ a-Si).

The first electrode 412c and the second electrode 412d of the transistor Tr are formed on the active pattern 412b to be spaced apart from each other at a predetermined interval. The first electrode 412c and the second electrode 412d may be formed of a material used to form the data line DL, for example, molybdenum (Mo), a molybdenum-tungsten alloy (MoW), chromium (Cr), tantalum (Ta), and titanium (Ti).

The first electrode 414a of the photodiode PD and the first electrode 412c of the transistor Tr are integrally formed on the gate insulating layer 413 to be electrically connected to each other.

The photoconductive layer 414b is formed on the first electrode 414a of the photodiode PD. Although not shown in FIG. 4, the photoconductive layer 414b may have a structure in which an n-type silicon layer, an intrinsic silicon layer, and a p-type silicon layer are sequentially stacked.

The second electrode 414c and the first electrode 414a of the photodiode PD are formed to face each other with the photoconductive layer 414b disposed between the second electrode 414c and the first electrode 414a. The second electrode 414c of the photodiode PD may include a transparent conductive material, for example, indium tin oxide (ITO), such that an X-ray can be applied to the photoconductive layer 414b.

A protective layer 415 that covers the photodiode PD and the transistor Tr is formed on a top surface of the base substrate 411. The protective layer 415 may be formed of a silicon nitride (SiNx), a silicon oxide (SiOx), or the like.

A contact hole 415a is formed in the protective layer 415 to expose the second electrode 414c of the photodiode PD. The bias line BL may be electrically connected to the second electrode 414c of the photodiode PD via the contact hole 415a.

An insulating layer 416 that covers the protective layer 415 and the bias line BL may further be formed on the top surface of the base substrate 411.

A scintillator 420 is formed on an upper surface of the pixel unit 110, i.e., on the insulating layer 416. The scintillator 420 converts an incident X-ray transmitted through the subject 20 from the energy source 10 into a green light having a visible light wavelength of about 550 nm and transmits the green light to the pixel unit 110. The scintillator 420 may include cesium iodide.

Figure 5A:
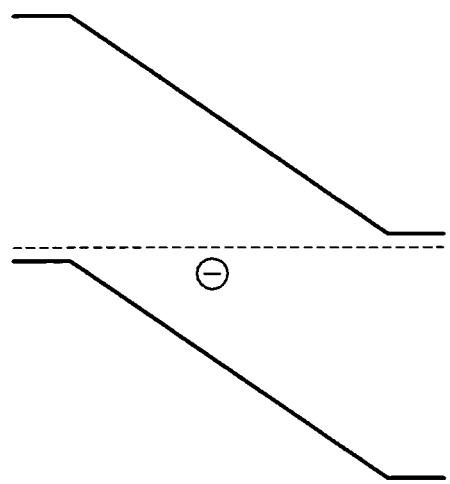
FIGS. 5A and 5B are diagrams for describing a charge trapping phenomenon occurring in a photodiode after X-ray radiation.
Figure 5B:
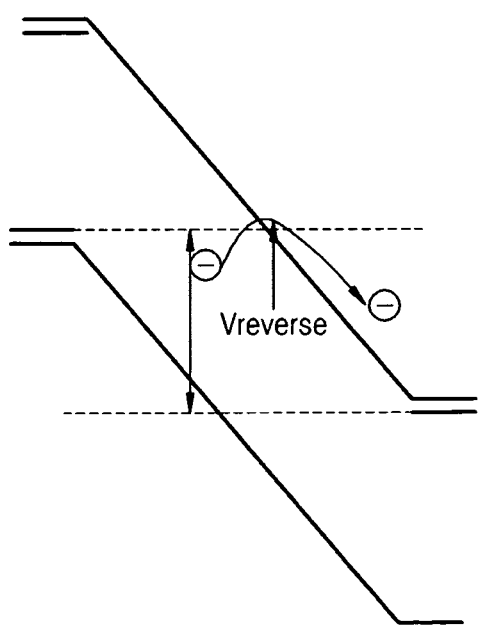

FIGS. 5A and 5B are diagrams for describing a charge trapping phenomenon occurring in a photodiode PD after X-ray radiation.

In the X-ray detector 100, if an X-ray transmitted through the scintillator 420 is applied to each of the photodiodes PD when a reverse bias is applied to the photodiode PD, a detection signal corresponding to the amount of the transmitted X-ray is generated in the photodiode PD. The photodiode PD may have a trap space in which charges are trapped. The trap space may be formed by a dangling bond capable of binding to electrons or holes.

When the X-ray transmitted through the scintillator 420 is applied to the photodiode PD, charges are trapped in the trap space, as shown in FIG. 5A.

The amount of charges trapped in the trap space corresponds to the amount of the X-ray applied to each of the photodiodes PD. In other words, as the amount of the X-ray applied to each of the photodiodes PD increases, the amount of charges trapped in the trap space increases. As the amount of the X-ray applied to each of the photodiodes PD decreases, the amount of charges trapped in the trap space decreases.

Since it takes considerable time for discharging the trapped charges out of the trap space, charges trapped in a previous frame may partially remain in the trap space in a current frame. Accordingly, the amount of charges in the trap space in the current frame may be greater than the amount of the X-ray applied in the current frame.

Referring to FIG. 5B, the energy gap between the first electrode and the second electrode of the photodiode PD decreases by X-ray radiation, and thus, the trapped charges may be easily transferred. In this case, the trapped charges are in a localized state with a relatively high energy level of about $10^{19}$ EV. Thus, the trapped charges may be relatively quickly out of the trapped state. When the photodiode PD is initiated after the X-ray radiation, the energy gap between the first electrode and the second electrode of the photodiode PD increases as shown in FIG. 5B, the trapped charges are in a deep state. In this case, the trapped charges have a relatively low energy level of about $10^{16}$ EV and need a high reverse voltage Vreverse to be out of the trapped state. It takes a longer time to be out of the trapped state in the deep state when compared to the localized state.

As a result, the trapped charges of the previous frame may partially be displayed as an image lag when an image corresponding to the amount of the X-ray of the current frame is displayed on the display device 400. The image lag may inhibit the display device 400 from accurately displaying the image corresponding to the amount of the X-ray.

If an interval between X-ray radiations is about 15 seconds, the amount of trapped charges that remain until the following scanning is less than 0.01%, and thus, there is no clinical problem. However, an interval between X-ray radiations may be less than 3 seconds, for example, in tomography. In addition, in RF solutions, a fluoroscopic image is acquired right after a radiation scanning. Accordingly, there is a need to remove an image lag in X-ray scannings performed at a short interval. Generally, methods of compensating for an image lag using software have been carried out to remove the image lag.

Figure 6:
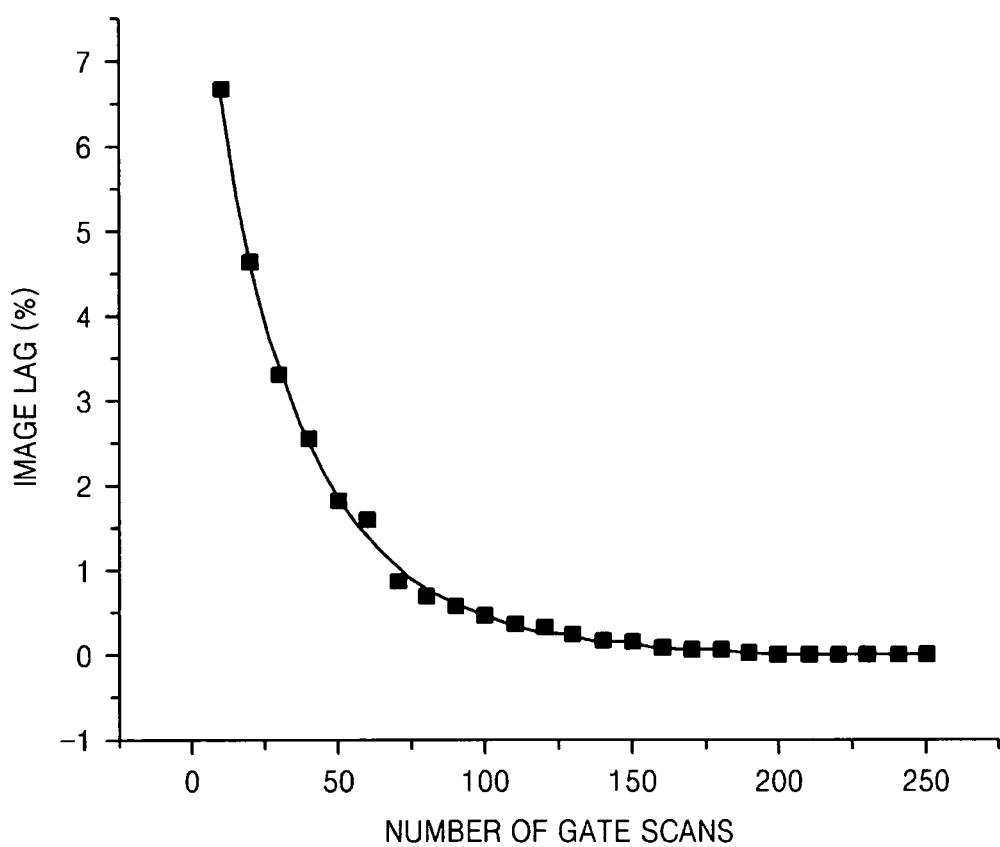
FIG. 6 is a graph illustrating a fitting curve for compensating for an image lag after X-ray radiation.

FIG. 6 is a graph illustrating a fitting curve for compensating for an image lag after X-ray radiation.

The compensation for the image lag may be performed by predicting an image lag using a fitting curve shown in FIG. 6. A residual image after the X-ray radiation may be easily detected using the fitting curve. However, the fitting curve may show different characteristics according to the photo-sensing pixel P, and thus, it is difficult to predict the fitting curve. Since each of the photo-sensing pixels P responds to the scrubbing after the X-ray radiation in a different way and tack time of each row of the photo-sensing pixels P for reading out is different, the fitting curve may show different characteristics according to the photo-sensing pixel P. As a result, each of the photo-sensing pixels P has a different decay tendency of the detection signal after the X-ray radiation, and thus, there is a need to perform separate calculations for all of the photo-sensing pixels P to compensate for the image lag using the fitting curve.

Figure 7:
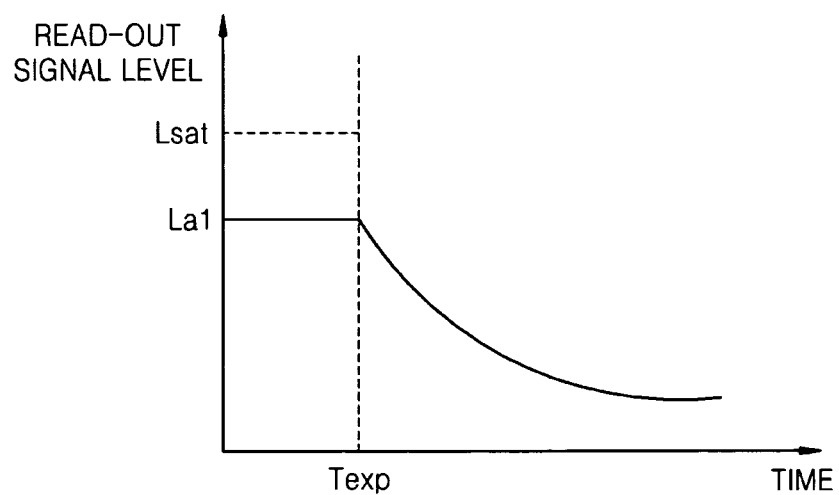
FIGS. 7 and 8 are graphs illustrating read-out signal levels and diode signal levels over time.
Figure 8:
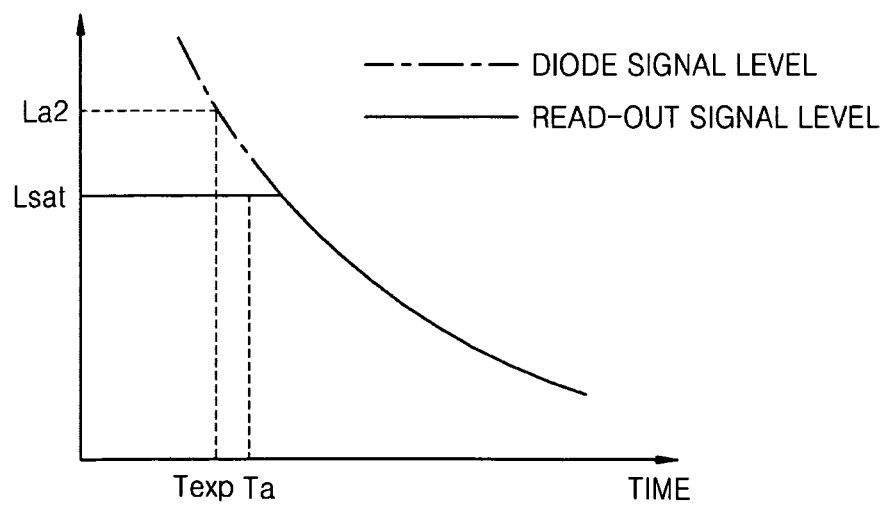

FIGS. 7 and 8 are graphs illustrating read-out signal levels and diode signal levels over time. In this regard, the read-out signal level refers to a signal level detected by the read-out integrated circuit 150, and the diode signal level refers to a detection signal level of the photodiode PD. The read-out signal level may be measured using an output from the read-out integrated circuit 150, but the diode signal level cannot be measured when the X-ray detector 100 is driven.

When the image lag is compensated for using the fitting curve, a read-out signal level equal to a signal saturation level Lsat may cause a problem. The signal saturation level Lsat is the highest level of the read-out signal output from the read-out integrated circuit 150. Even though the read-out signal level equal to the signal saturation level Lsat is detected in the X-ray detector 100, the photodiode PD may not be saturated because a capacitance Cph of the photodiode PD is greater than a capacitance Cfb of the capacitor CP of the signal detecting unit 160. In other words, even though the read-out signal level equal to the signal saturation level Lsat is output in the X-ray detector 100, the photodiode PD of each of the photo-sensing pixels P may still not be saturated. Accordingly, in this case, the diode signal level of the photodiode PD by the X-ray radiation cannot be detected, and thus, the accuracy of the image lag compensation using the fitting curve may be reduced.

As shown in FIG. 7, if a read-out signal level La1 less than the signal saturation level Lsat is detected, the read-out signal level decreases over time after the X-ray radiation is terminated Texp. However, as shown in FIG. 8, if the read-out signal level is equal to the signal saturation level Lsat, the read-out signal level equal to the signal saturation level Lsat is detected even after the X-ray radiation is terminated Texp at a time Ta because the photodiode PD has a diode signal level La2 that is higher than the signal saturation level Lsat. In this case, the diode signal level La2 cannot be predicted using the read-out signal level.

In order to overcome these problems, a dark read-out may further be performed after the X-ray read-out to increase the accuracy of the image lag compensation using the fitting curve.

Figure 9:
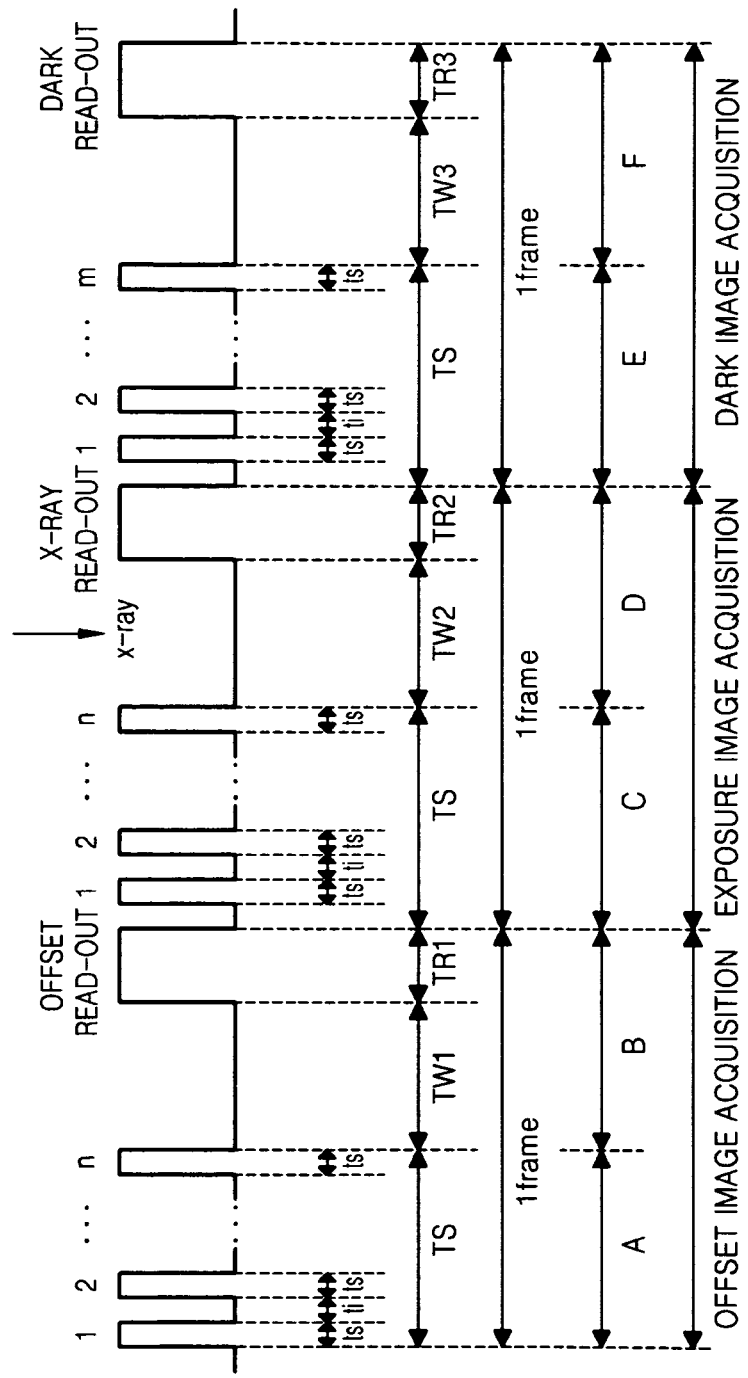
FIG. 9 is a timing diagram for describing a method of driving an X-ray detector, according to an embodiment of the present invention.

FIG. 9 is a timing diagram for describing a method of driving an X-ray detector, according to an embodiment of the present invention.

A method of driving an X-ray detector, according to an embodiment of the present invention, includes an offset image acquisition period, an exposure image acquisition period, and a dark image acquisition period. Referring to FIG. 9, the X-ray detector 100 acquires an offset image by performing a read-out without an X-ray radiation during the offset image acquisition period, an X-ray image by performing a read-out after an X-ray radiation during the exposure image acquisition period, and a dark image for compensating for a image lag during the dark image acquisition period.

The offset image acquisition period includes a first scrubbing period A and an offset read-out period B.

During the first scrubbing period A, the X-ray detector 100 performs n gate scans, where n is a natural number. A gate scan may be performed at least twice. A gate scan time ts is a time period during which a gate scan is performed, by sequentially applying gate pulses from the first gate line to the last gate line. A gate scan interval n may be 0 seconds. The gate scans may be performed for a total gate scan time TS.

In particular, the gate driver 130 sequentially applies the gate pulses to the gate lines GL, and the transistors Tr of each column are turned on by the gate pulses. Then, the turned on transistors Tr are turned off. In this regard, the reset device SW of the signal detecting unit 160 is closed and electrically connected to both terminals of the capacitor CP. Electrical signals of the data lines DL are discharged by the reset device SW. That is, data obtained during the scrubbing is deleted. When the gate scan is terminated, the reset device SW is open. In addition, during the first scrubbing period A, each photodiode PD is charged to an initial predetermined electric potential between gate scans.

The scrubbing is an operation resetting the image lag that remains in the photodiode PD after the X-ray radiation and initiating the X-ray detector 100. In addition, the scrubbing is performed to maintain a bias electric potential of both terminals of the photodiode PD during a pause. In addition, the scrubbing may be performed to reduce the influence of delayed or incomplete charge restoration of the photodiode PD. After exposure, the amount of charges required to restore the electric potential of both terminals of the photodiode PD to the initial electric potential is integrated in a unit area of each photo-sensing pixel P while the X-ray is radiated and is proportionate to the amount of the X-ray detected by each photo-sensing pixel P.

In the offset read-out period B, the X-ray detector 100 is maintained in an idle state during an offset window time TW1. In this regard, the transistor Tr is turned off.

After the offset window time TW1, the X-ray detector 100 performs an offset read-out TR1 that reads the detection signal of each photo-sensing pixel P.

In particular, the gate driver 130 sequentially applies gate pulses to the plurality of gate lines GL. By the gate pulses, the transistor Tr of each photo-sensing pixel P is turned on. The detection signal output from the turned on transistor Tr is read out through the data lines DL and transmitted to the read-out integrated circuit 150.

The signal processing unit 300 obtains an offset image based on the signal output from the read-out integrated circuit 150.

The exposure image acquisition period includes a second scrubbing period C and an X-ray read-out period D.

During the second scrubbing period C, the X-ray detector 100 performs n gate scans. A gate scan may be performed at least twice. A gate scan time is a time period during which a gate scan is performed by sequentially applying gate pulses from the first gate line to the last gate line. A gate scan interval ti may be 0. The n gate scans may be performed for a total gate scan time TS.

In particular, the gate driver 130 sequentially applies the gate pulses to the plurality of gate lines GL, and the transistor Tr of each column is turned on by the gate pulses. In this regard, the reset device SW of the signal detecting unit 160 is closed and electrically connected to both terminals of the capacitor CP. That is, data obtained during the scrubbing is deleted. The detection signal of the data line DL is discharged by the reset device SW. In addition, during the second scrubbing period C, each photodiode PD is charged to a predetermined initial electric potential between gate scans.

After the gate scan is terminated, the reset device SW is open.

During the X-ray read-out period D, the X-ray detector 100 is exposed to the X-ray during an X-ray window time TW2. Here, the transistor Tr is turned off. If the X-ray detector 100 is exposed to the X-ray, the X-ray is absorbed by the scintillator 420, light emitted from the scintillator 420 to the photodiode PD partially discharge the photodiode PD. The amount of the light emitted from the scintillator 420 to the photodiode PD is proportionate to the amount of the X-ray absorbed into the scintillator 420.

After the X-ray window time TW2, the X-ray detector 100 performs an X-ray read-out TR2 that reads an electrical signal of each photo-sensing pixel P.

In particular, the gate driver 130 sequentially applies gate pulses to the plurality of gate lines GL. By the gate pulses, the transistor Tr of each photo-sensing pixel P is turned on. The detection signal generated in the photodiode PD during the X-ray window time TW2 is transmitted to the turned on transistor Tr. The detection signal output from the turned on transistor Tr is read out by the data lines DL and transmitted to the read-out integrated circuit 150.

The dark image acquisition period includes a third scrubbing period E and a dark read-out period F.

During the third scrubbing period E, the X-ray detector 100 performs m gate scans, where m is a natural number. The m, as the number of gate scans during the third scrubbing period E, may be the same as or different from the n, as the number of gate scans during the first and second scrubbing periods A and C. In addition, m, as the number of gate scans during the third scrubbing period E, may be determined such that the dark image has a read-out signal level less than the signal saturation level Lsat. That is, m may be determined such that the dark image has a read-out signal level less than the signal saturation level Lsat even when the photodiode PD is saturated by the X-ray radiation. According to this configuration, the diode signal level may be accurately estimated even when the read-out signal level equal to the signal saturation level Lsat is detected. In addition, by accurately estimating the diode signal level by the exposure, the image lag may be accurately compensated for.

A gate scan time ts is a time period during which a gate scan is performed by sequentially applying gate pulses from the first gate line to the last gate line. A gate scan interval ti may be 0. The m gate scans may be performed for a total gate scan time TS.

In particular, the gate driver 130 sequentially applies the gate pulses to the plurality of gate lines GL, and the transistor Tr of each column is turned on by the gate pulses. In this regard, the reset device SW of the signal detecting unit 160 is closed and electrically connected to both terminals of the capacitor CP. That is, data obtained during the scrubbing is deleted. The electrical signal of the data line DL is discharged by the reset device SW. In addition, during the third scrubbing period E, each photodiode PD is charged to an initial predetermined electric potential between the gate scans.

After the third scrubbing period E is terminated, the X-ray detector 100 is maintained in an idle state during a dark window time TW3 in the dark read-out period F. During the dark window time TW3, the transistor Tr is turned off. The dark window time TW3 may be the same as or different from the X-ray window time TW2.

According to another embodiment, the dark read-out may be performed right after the third scrubbing period E without the dark window time TW3. In this case, the dark window time TW3 may be the gate scan interval ti.

After the dark window time TW3, the X-ray detector 100 may perform a dark read-out TR3 that reads the detection signal of each photo-sensing pixel P.

In particular, the gate driver 130 sequentially applies gate pulses to the plurality of gate lines GL. By the gate pulses, the transistor Tr of each photo-sensing pixel P is turned on. In this regard, the detection signal subtracted from the X-ray image is transmitted to the turned on transistor Tr during the third scrubbing period E. The detection signal output from the turned on transistor Tr is read out by the data line DL and transmitted to the read-out integrated circuit 150.

The signal processing unit 300 subtracts the offset image from the X-ray image and compensates for the image lag using the dark image to obtain an X-ray scanning image.

Figure 10:
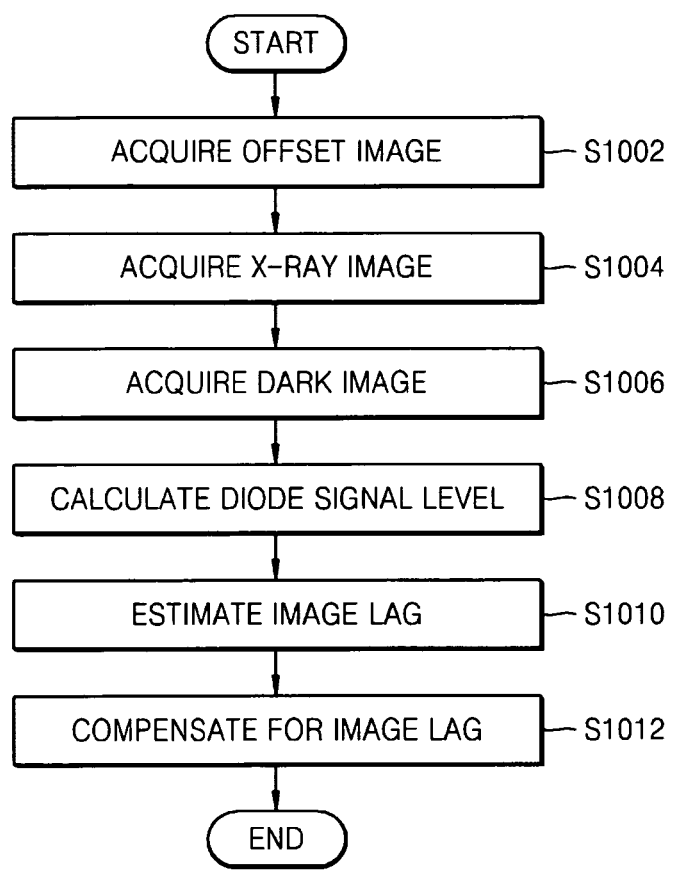
FIG. 10 is a flowchart of a method of compensating for an image lag, according to an embodiment of the present invention.

FIG. 10 is a flowchart of a method of compensating for an image lag, according to an embodiment of the present invention.

First, an offset image is acquired during an offset image acquisition period (S1002), an X-ray image is acquired during an X-ray image acquisition period (S1004), and a dark image is acquired during a dark image acquisition period (S1006). However, the order of acquiring the offset image is not limited to the flowchart shown in FIG. 10, and the offset image may also be acquired after the X-ray image acquisition.

Then, a diode signal level is calculated using the X-ray image and the dark image (S1008). If the read-out signal level is less than the signal saturation level Lsat, the read-out signal level of the X-ray image is the diode signal level. If the read-out signal level is equal to the signal saturation level Lsat, the diode signal level of the X-ray radiation is estimated using a decay curve of each photo-sensing pixel P and the dark image. In this regard, the decay curve may be a curve indicating decay tendency of the diode signal level according to the number of gate scans. If the read-out signal level is equal to the signal saturation level Lsat, the diode signal level of the X-ray radiation may be estimated by corresponding the read-out signal level of the dark image to the decay curve of each photo-sensing pixel P. The decay curve of each photo-sensing pixel P may be stored in the control unit 200 or the signal processing unit 300.

Then, an image lag is estimated using the diode signal level of the X-ray radiation (S1010), and the image lag caused by the current X-ray scanning is compensated for in the following X-ray scanning using the estimated image lag (S1012). According to an embodiment of the present invention, the diode signal level may be accurately estimated even when the read-out signal equal to the signal saturation level Lsat is detected, and thus, the image lag may be more accurately estimated compared to estimation of the image lag using the fitting curve. For example, if the diode signal level is La2 and the X-ray detector 100 detects the signal saturation level Lsat when the X-ray radiation is terminated Texp as shown in FIG. 8, the image lag is compensated for using the signal saturation level Lsat as the diode signal level. In this case, the image lag is estimated to be lower than the real image lag during the following X-ray scanning, and thus, the image lag may not be completely compensated for. According to an embodiment of the present invention, the diode signal level is estimated as La2 when the X-ray radiation is terminated Texp using the dark image, and the image lag caused by the current X-ray scanning is compensated for in the following X-ray scanning using the real diode signal level. Thus, the image lag is completely compensated for.

Since the accuracy of the image lag compensation is increased according to an embodiment of the present invention, the X-ray scanning interval may be reduced. If the X-ray scanning is performed using the X-ray detector 100, a plurality of gate scans need to be performed to remove the image lag. However, the image scanning interval may be considerably reduced by performing the following X-ray scanning after only performing a gate scan for estimating the image lag since the accuracy of the image lag compensation is increased according to an embodiment of the present invention.

FIG. 11 is a block diagram of a signal processing unit 300 of FIG. 1, according to an embodiment of the present invention.

The signal processing unit 300 includes a decay curve storing unit 1102, a diode signal level calculating unit 1104, a fitting curve storing unit 1106, an image lag estimating unit 1108, an image lag compensating unit 1110, and an offset image removing unit 1112.

The decay curve storing unit 1102 stores a decay curve illustrating decay tendency of the diode signal level according to the number of gate scans. The decay curve for each of the photo-sensing pixels P may be separately stored.

The diode signal level calculating unit 1104 calculates the diode signal level by the X-ray radiation from the X-ray image and the dark image using the decay curve. As described above, the diode signal level calculating unit 1104 calculates the read-out signal level of the X-ray image as the diode signal level when the read-out signal level is less than the signal saturation level Lsat and estimates the diode signal level by the X-ray radiation using the decay curve of each photo-sensing pixel P and the dark image when the read-out signal level is equal to the signal saturation level Lsat. If the read-out signal level is equal to the signal saturation level Lsat, the diode signal level calculating unit 1104 estimates the diode signal level by corresponding the read-out signal level of the dark image to the decay curve of each photo-sensing pixel P.

The fitting curve storing unit 1106 stores the fitting curve illustrating the rate of the image lag according to the number of gate scans. The fitting curve for each of the photo-sensing pixels P may be separately stored.

The image lag estimating unit 1108 estimates the image lag using the fitting curve from the diode signal level calculated by the diode signal level calculating unit 1104. The image lag of the following X-ray radiation may be estimated by corresponding the calculated diode signal level to the fitting curve.

The image lag compensating unit 1110 compensates for the image lag of the following X-ray scanning using the image lag caused by the current X-ray scanning estimated by the image lag estimating unit 1108. For example, the image lag compensating unit 1110 may compensate for the image lag of the following X-ray scanning by subtracting the image lag from the X-ray image obtained by the following X-ray scanning. In the current X-ray scanning, the image lag caused by the previous X-ray scanning is compensated for using the image lag of the previous X-ray scanning.

In addition, the offset image removing unit 1112 removes the offset image by subtracting the offset image from the X-ray image. However, the order of removing the offset image and compensating for the image lag is not limited thereto.

According to embodiments of the present invention, the real signal level of a photodiode by the X-ray radiation may be obtained even when the signal saturation occurs in the X-ray detector, and thus, a residual image may be efficiently compensated for.

In addition, a stand-by time for the X-ray detector may be reduced by increasing the accuracy of the image lag compensation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An X-ray detecting system, comprising:
an X-ray detector comprising:
a plurality of photo-sensing pixels, each of the photo-sensing pixels comprising to photodiode that gener- ates an electrical detection signal corresponding to an incident light and a switching device that transmits the detection signal;

a gate driver sequentially applying gate pulses to the switching, devices of the photo-sensing pixels via a plurality of gate lines, the switching devices of the photo-sensing pixels being turned on by the gate pulses; and a read-out integrated circuit reading out the detection signal generated from the plurality of photo-sensing pixels; and a signal processing unit reading the detection signal output from the read-out integrated circuit and producing a diode signal level from the detection signal, the signal processing unit storing a decay curve of each of the photo-sensing pixels, the decay curve representing a decay tendency of the diode signal level according to a number of gate scans, the detection signal sequentially including an offset image, an X-ray image following the offset image, and a dark image following the X-ray image, the incident light being applied to the photo-sensing pixels during a time period between the offset image and the X-ray image, the signal processing unit setting the diode signal level at a signal level of the X-ray image if the signal level of the X-ray image is less than a signal saturation level, the signal processing unit setting, the diode signal level at a signal level of the decay curve corresponding to a signal level of the dark image if the signal level of the X-ray image is no less than the signal saturation level, the gate driver sequentially applying gate pulses to the gate lines to perform at least one gate scan during a time period between the X-ray image and the dark image.

2. The X-ray detecting system of claim 1, wherein the signal processing unit storing a fitting curve of each of the photo-sensing pixels, the fitting curve representing a rate of an image lag according to the number of gate scans, the signal processing unit setting an image lag of the X-ray image at a value of the fitting curve corresponding to the diode signal level.

3. The X-ray detecting system of claim 2, wherein the signal processing unit comprises:

a diode signal level calculating unit calculating the diode signal level from the X-ray image and the dark image using the decay curve;

an image lag estimating unit estimating the image lag of the X-ray image from the diode signal level using the fitting curve; and an image lag compensating unit subtracting the image lag of the X-ray image from the X-ray image to obtain an image lag compensated X-ray image.

4. The X-ray detecting system of claim 3, wherein the signal processing unit further comprises:

a decay curve storing unit storing the decay curve; and a fitting curve storing unit storing the fitting curve.

5. The X-ray detecting system of claim 3, wherein the signal processing unit further comprises an offset image removing unit subtracting the offset image from the X-ray image or from the image lag compensated X-ray image to remove the offset image from the X-ray image.

6. The X-ray detecting system of claim 2, wherein the decay curve and the fitting curve vary according to the photo-sensing pixel.

7. A method of driving an X-ray detecting system, the method comprising:

exposing an X-ray detector to an X-ray;

obtaining an X-ray detection signal in the X-ray detector;

outputting the detection signal from the X-ray detector to a signal processing unit, the detection signal output to the signal processing unit sequentially including an offset image, an X-ray image following the offset image, and a dark image following the X-ray image, a plurality of photo-sensing pixels of the X-ray detector being exposed to the X-ray during a time period between the offset image and the X-ray image;

setting a diode signal level at a signal level of the X-ray image if the signal level of the X-ray image is less than a signal saturation level;

setting the diode signal level at a signal level of a decay curve corresponding to a signal level of the dark image if the signal level of the X-ray image is no less than the signal saturation level, the signal processing unit storing a decay curve of each of the plurality of photo-sensing pixels of the X-ray detector, the decay curve representing a decay tendency of the diode signal level according to a number of gate scans; and performing at least one gate scan during a time period between the X-ray image and the dark image.

8. The method of claim 7, wherein the signal processing unit stores a fitting curve of each of the photo-sensing pixels of the X-ray detector, the fitting curve representing a rate of an image, lag according to the number of gate scans, the method further comprising setting an image lag of the X-ray image at a value of the fitting curve corresponding to the diode signal level.

9. The method of claim 8, further comprising subtracting the image lag of the X-ray image from the X-ray image to obtain an image lag compensated X-ray image.

10. The method of claim 9, further comprising subtracting the offset image from the X-ray image or from the image lag compensated X-ray image to remove the as et image from the X-ray image.

11. The method of claim 8, wherein the decay curve and the fitting curve vary according to the photo-sensing pixel.

* * * * *